March 1, 1949.  H. GOEBEL  2,463,168
EGG SEPARATOR
Filed Jan. 5, 1946
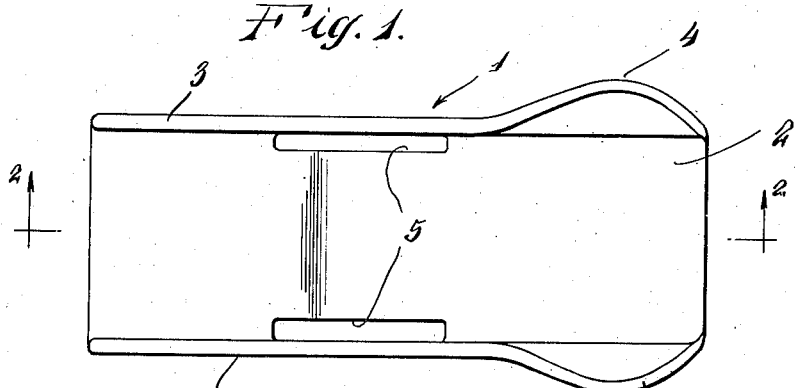
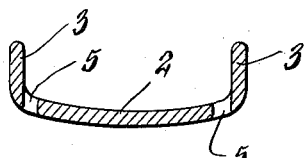
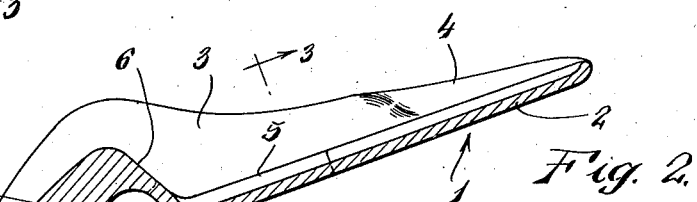
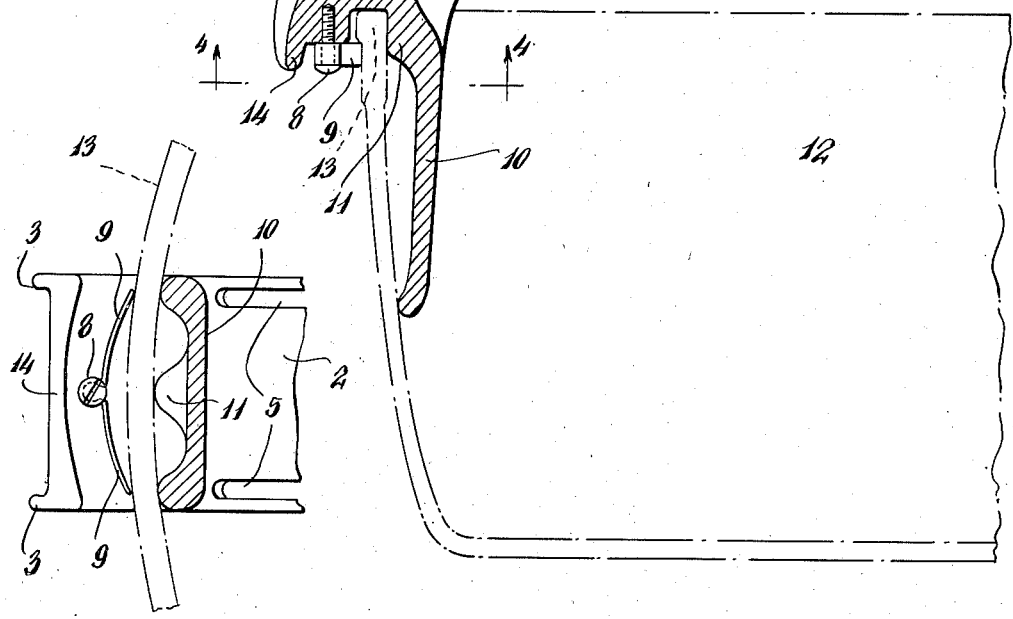
INVENTOR.
Henry Goebel
BY Henry J. E. Metzler
Agt.

Patented Mar. 1, 1949

2,463,168

UNITED STATES PATENT OFFICE 2,463,168

EGG SEPARATOR

Henry Goebel, Hollis, N. Y.

Application January 5, 1946, Serial No. 639,311

1 Claim. (Cl. 146—2)

This invention relates to improvements in egg separators and, more specifically to a very simple and inexpensive device by the use of which the whites and yolks of eggs may be very easily and efficiently separated.

An important object of the present invention is the provision of a device of the character described which not only separates the whites from the yolks, but which also deposits the whites in one receptacle and the yolks in another receptacle automatically, so that no pushing or touching of the yolks is necessary thus making the separation of the whites from the yolks highly sanitary and effortless.

Another object of the present invention is the provision of a device of the character described which is very simply and easily manipulated, and which can be detachably secured to the rim or edge of any suitable receptacle or vessel.

Further objects of the instant invention reside in any novel feature of construction or operation or novel combination of parts present in the embodiment of the invention described and shown in the accompanying drawing whether within or without the scope of the appended claim and irrespective of other specific statements as to the scope of the invention contained herein.

In the drawing:

Figure 1 is a top plan view of a preferred embodiment of my invention.

Figure 2 is a sectional view on the line 2—2 of Fig. 1;

Figure 3 is a sectional view on the line 3—3 of Fig. 2; and

Figure 4 is a sectional view on the line 4—4 of Fig. 2 partially broken away.

Similar reference characters refer to similar parts throughout the several views.

In the drawing the numeral 1 denotes a sloping open channel member of metal, plastic material, wood, glass, or the like, which has a curved bottom 2 and which has flanges whose main portions 3 are preferably straigth and whose upper portions 4 are preferably curved, as may be seen in Figure 1. The bottom of the upper portion of one channel member is gently downwardly inclined, at about twenty degrees, and is separated from the steeply downwardly inclined end portion 7 by an upwardly inclined portion 6 (Fig. 2), which forms a low dam. Longitudinal slots 5 are extended through the bottom 2 preferably adjacent the flange portions 3. These slots 5 are located either near the dam portion 6 or they are extended partially through said dam portion 6 and partially through said gently downwardly inclined portion.

The channel member 1 is attachable to the rim or wall or edge of a vessel or receptacle 12 (indicated in dash-and-dotted lines in Fig. 2) by any suitable means. I prefer to carry out this feature of my invention in the manner shown in Figs. 2 and 4, where it will be seen that a vertical rib 10 is extended from the lower side of the channel member 1, and a spring 9, which is secured to the bottom of the portion 7 by means of a screw 8 or the like, presses the upper wall portion 13 of the receptacle 12 against the rib 10. The upper portion 11 of the rib 10 is preferably bulged outwardly, and the lowest extremity 14 of the portion 7 is preferably extended over, and in spaced relation to, the spring 9 (Figures 2 and 4).

My new and improved egg separator works as follows: The content of the first egg (not shown) is dropped near the upper end of the chute. The white flows over the edges of the slots 5, while the yolk is retained. The next egg is dropped above the first one and is flowing down. Having the bottom of the chute inclined at a certain angle, so that the downflowing egg will just push the retained yolk of the first one over the upturned portion 6 of the chute but not to let it go over, the separation of the eggs is automatically accomplished by gravity without any moving parts. The whites, which pass through the slots 5 will be accumulated in the receptacle 12, while the yolks fall from the portion 7 into another, separate receptacle (not shown). Since the bottom 2 is curved (Fig. 3), the eggs will roll in the center of the slope, so that the yolks do not come near the edges of the slots 5.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which as a matter of language might be said to fall therebetween.

Having thus fully described my said invention, what I claim as new and desire to secure by Letters Patent is:

An egg separator comprising a longitudinal chute having parallel side walls and a bottom which is downwardly curved towards its longitudinal center line, a longitudinal rib formed as a unit with said chute and having an outwardly bulged upper portion and a vertical main portion extended from the lower side of said chute and being adapted to engage laterally the inner side of a receptacle, and a spring secured to the lower end portion of said chute opposite to said rib being adapted to engage laterally the outer side of the receptacle and to press it toward said rib, the chute portion above said rib being upturned so as to form a dam between the downwardly inclined end portion to which said spring is secured and the gently downwardly inclined major chute portion, a pair of longitudinal slots provided adjacent the side walls of the chute in the bottom of a part of said major chute portion being extended into a part of the upwardly inclined section of the upturned chute portion, and said major chute portion being inclined at such an angle that an egg while flowing down thereon gains sufficient inertia for pushing the yolk of an egg retained between said slots over said upturned portion, all substantially as described.

HENRY GOEBEL.

REFERENCES CITED

The following references are of record in the file of this patent:

UNITED STATES PATENTS

| Number | Name | Date |
|---|---|---|
| 648,598 | Salomon | May 1, 1900 |
| 828,312 | Herrick | Aug. 14, 1906 |
| 2,404,130 | Frank | July 16, 1946 |
| 2,130,964 | Minkiewitz | Sept. 20, 1946 |